United States Patent
Schrödinger

(10) Patent No.: US 7,406,268 B2
(45) Date of Patent: Jul. 29, 2008

(54) OPTICAL RECEIVER CIRCUIT

(75) Inventor: Karl Schrödinger, Berlin (DE)

(73) Assignee: Avago Technologies Limited, Fort Collins, CO (US)

( * ) Notice: Subject to any disclaimer, the term of this patent is extended or adjusted under 35 U.S.C. 154(b) by 668 days.

(21) Appl. No.: 10/649,602

(22) Filed: Aug. 27, 2003

(65) Prior Publication Data

US 2005/0047801 A1 Mar. 3, 2005

(51) Int. Cl.
 *H04B 10/06* (2006.01)

(52) U.S. Cl. .............. 398/202; 398/208; 398/209; 398/210; 398/213; 398/214; 398/135; 398/136; 398/25; 398/26; 398/24; 250/214 A; 250/214 C; 250/214 AG; 330/59; 330/308

(58) Field of Classification Search ......... 398/202–214, 398/135, 164, 158, 136, 137, 119, 33, 25, 398/26, 27, 22, 23, 24; 250/214 A, 214 C, 250/214 AG; 330/59, 308
See application file for complete search history.

(56) References Cited

U.S. PATENT DOCUMENTS

| | | | | |
|---|---|---|---|---|
| 5,111,156 | A * | 5/1992 | Hachiuma | 330/257 |
| 5,182,448 | A * | 1/1993 | Ohtsuka et al. | 250/214 B |
| 6,034,424 | A * | 3/2000 | Fujimura et al. | 257/696 |
| 6,731,881 | B2 * | 5/2004 | Nomura | 398/135 |
| 6,862,322 | B1 * | 3/2005 | Ewen et al. | 375/316 |
| 7,002,131 | B1 * | 2/2006 | Lewis | 250/214 A |
| 2002/0175272 | A1 * | 11/2002 | Shimizu | 250/214 A |
| 2002/0191263 | A1 * | 12/2002 | Hoang et al. | 359/189 |
| 2006/0120731 | A1 * | 6/2006 | Faska et al. | 398/202 |

FOREIGN PATENT DOCUMENTS

| | | |
|---|---|---|
| EP | 0 409 278 A2 | 1/1991 |
| EP | 0 409 278 A3 | 1/1991 |
| EP | 1 261 152 A2 | 11/2002 |

OTHER PUBLICATIONS

Maxim-Max3970 Spec Sheet, Rev. 1/02, pp. 1-10.*
Yano et al, Low-Noise Current Optoelectronic Integrated Receiver with Internal Equalizer for Gigabit-per-Second Long-Wavelength Optical Communications, IEEE Journal of Lightwave Technology vol. 8 No. 9 Sep. 1990.*
Jens Müllrich et al.: "High-Gain Transimpedance Amplifier in InP-Based HBT Technology for the Receiver in 40-Gb/s Optical-Fiber TDM Links", IEEE Journal of Solid-State Circuits, Vol. 35, No. 9, Sep. 2000, pp. 1260-1265.

* cited by examiner

*Primary Examiner*—Hanh Phan
(74) *Attorney, Agent, or Firm*—Smith Fronwein Tempel Greenlee Blana LLC

(57) ABSTRACT

An optical receiver circuit is constructed to be immune to interference from external interference signals. The optical receiver circuit includes a differential amplifier having an optical reception device connected to one input of the differential amplifier. The optical receiver circuit also includes an electrical element for simulating the electrical behavior of the reception device in the illumination-free state. The electrical element is connected to the other input of the differential amplifier.

18 Claims, 1 Drawing Sheet

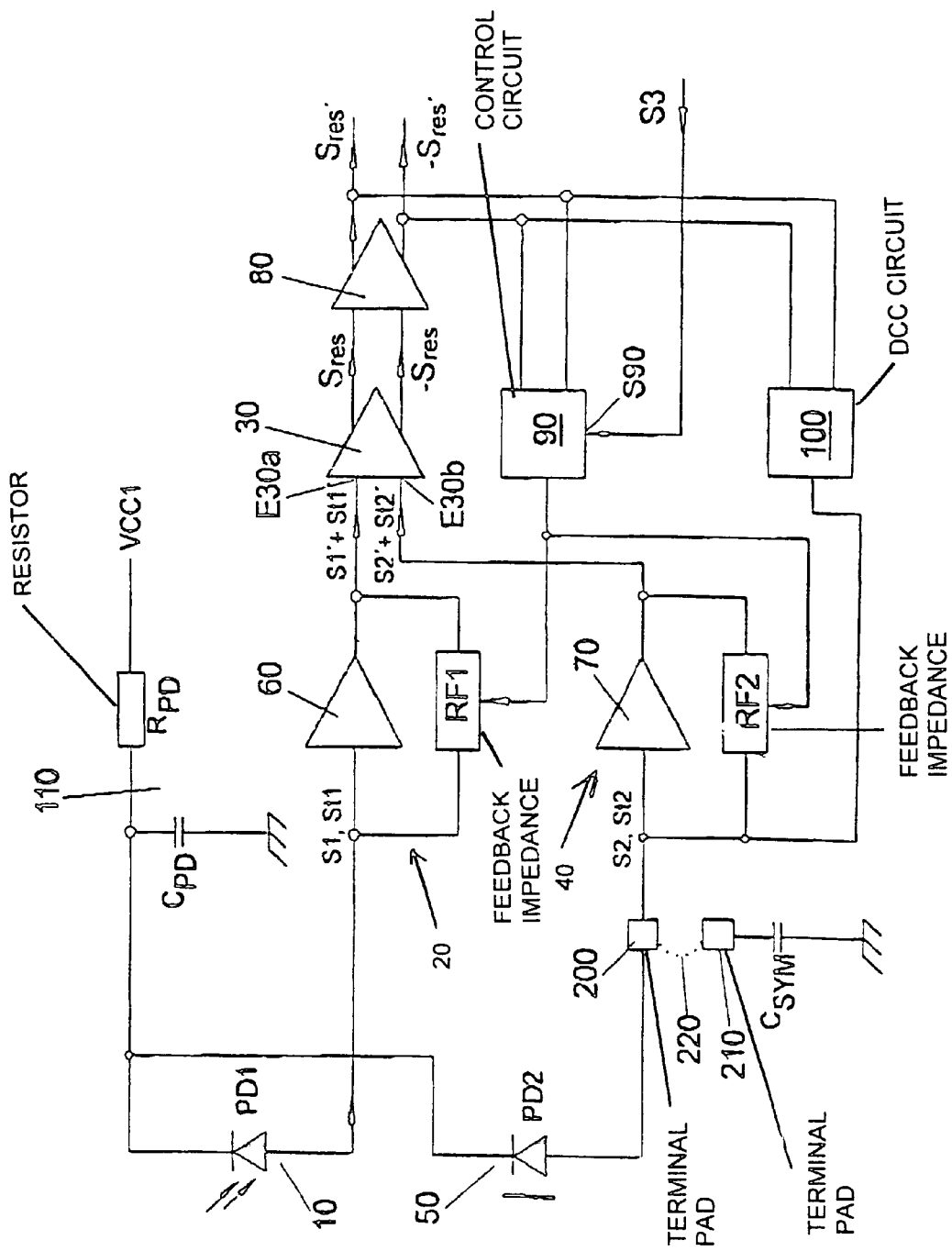

OPTICAL RECEIVER CIRCUIT

BACKGROUND OF THE INVENTION

Field of the Invention

The invention relates to an optical receiver circuit having an optical reception device and an amplifier device connected downstream. Light incident on the reception device (e.g. photodiode)—for example light from an optical waveguide of an optical data transmission system—is detected by the reception device with the formation of an electrical signal (e.g. photocurrent); the electrical signal is subsequently amplified by the amplifier device connected downstream.

Optical receiver circuits of this type require a very high sensitivity since the optical light signals to be received and thus the electrical signals formed by the reception device are generally very small. For this reason, the susceptibility to interference is also very high; this means that high-frequency interference—for example on the supply voltage of the optical receiver circuit and/or received radiated electromagnetic interference (EMI: electromagnetic interference)—can considerably impair the functionality of the optical receiver circuit.

In order to avoid interference from the outside, a considerable outlay on electromagnetic shielding is expended in the case of the previously known optical receiver circuits. In particular, considerable efforts are undertaken to suppress high-frequency interference, for example on the supply voltage.

It is evident that these shielding measures lead to considerable additional costs in the production of the previously known receiver circuits.

A previously known optical receiver circuit having a reception device and an amplifier connected downstream is described for example in the article "High Gain Transimpedance Amplifier in InP-Based HBT Technology for the Receiver in 40 Gb/s Optical-Fiber TDM Links" (Jens Mallrich, Herbert Thurner, Ernst Mullner, Joseph F. Jensen, Senior Member, IEEE, William E. Stanchina, Member, IEEE, M. Kardos, and Hans-Martin Rein, Senior Member, IEEE—IEEE Journal of Solid State Circuits, vol. 35, No. 9, September 2000, pages 1260 to 1265). In this receiver circuit, a differentially operated transimpedance amplifier—that is to say a differential amplifier—is present at the input end, which amplifier is connected by one input to a photodiode as reception device. The other input of the differentially operated transimpedance amplifier is connected to a DC amplifier which feeds a "correction current" into the differential amplifier for the offset correction of the photocurrent of the photodiode. The magnitude of this "correction current" that is fed in amounts to half the current swing of the photodiode during operation.

SUMMARY OF THE INVENTION

The invention is based on the object of specifying an optical receiver circuit which is immune to interference with respect to external interference signals.

Accordingly, the invention provides an optical receiver circuit having an optical reception device and a differential amplifier connected downstream. In this case, the reception device is connected to one of the two inputs of the differential amplifier. An electrical element, which simulates the electrical behavior of the reception device in the "illumination-free case", is connected to the other of the two inputs of the differential amplifier. An "illumination-free case" is understood here to mean that the electrical element behaves electrically to the greatest possible extent like the reception device if no light to be detected impinges on the reception device.

One essential advantage of the optical receiver circuit according to the invention is to be seen in the fact that this receiver circuit is particularly immune to interference. In the receiver circuit according to the invention, this is achieved by means of the "fully differential" design of the circuit or the quasi-symmetrical input-end circuitry of the differential amplifier. In this case, the fully differential design is based on the electrical element according to the invention, which simulates the electrical behavior of the reception device in the illumination-free case. On account of the electrical element, the differential amplifier is connected up symmetrically, so that high-frequency interference is effectively suppressed. This is because high-frequency interference will occur simultaneously on account of the symmetrical input-end circuitry of the differential amplifier at the two inputs of the differential amplifier, so that the interference is suppressed to the greatest possible extent by virtue of the common-mode rejection that is always high in the case of differential amplifiers.

The optical receiver circuit according to the invention thus differs significantly from the previously known receiver circuits mentioned in the introduction which, although they have a differential amplifier at the input end, are connected up asymmetrically at the input end. In the prior art, potential interference elements such as, for example, a bonding wire of the reception device, the capacitance of the reception device and further capacitive construction elements—for example capacitances and inductances in the region of the reception device—thus occur exclusively at a terminal of the differential amplifier and are thus amplified directly. In the previously known "asymmetrical" circuitry of the differential amplifier, the interference signals thus pass to the "most sensitive location" of the optical receiver circuit and are amplified directly. In contrast to this, in the receiver circuit according to the invention, the interference signals are "virtually" filtered out and effectively suppressed, to be precise on account of the symmetrical circuitry of the differential amplifier with the aid of the element which simulates the behavior of the reception device in the non-illuminated case and on account of the common-mode rejection of the differential amplifier.

In summary, it can thus be established that, in the case of the optical receiver circuit according to the invention, a particularly high degree of immunity to interference is achieved as a result of the symmetrical input-end circuitry of the differential amplifier of the receiver circuit.

A further essential advantage of the optical receiver circuit according to the invention is that this receiver circuit can be produced more cost-effectively than the previously known receiver circuits since it is possible largely to dispense with complicated shielding measures for suppressing interference influences on account of the "inner" interference suppression by the differential amplifier.

In order to provide for the optical receiver circuit to achieve a particularly high gain, an advantageous development of the receiver circuit provides for the reception device and the electrical element to be connected to the differential amplifier in each case by means of a preamplifier. Interference possibly caused by the preamplifiers is suppressed, and thus becomes ineffective, on account of the common-mode rejection of the differential amplifier—in the same way as the rest of the interference signals. Consequently, a high gain is achieved with the preamplifiers, without interference being amplified.

The two preamplifiers are preferably identical preamplifiers in order to achieve a maximum interference suppression of the interference signals that are possibly generated by the preamplifiers themselves or the interference signals that are coupled into the preamplifier.

The electrical element which simulates the electrical behavior of the reception device in the illumination-free case may be, for example, a reception device ("dummy reception device") which is identical to the reception device ("useful" reception device) of the receiver circuit and is darkened in such a way that no light can fall on it. The "useful" reception device and the "dummy" reception device are preferably monolithically integrated together on a semiconductor chip in order to ensure that both reception devices have an approximately identical electrical behavior.

As an alternative, the electrical element which simulates the electrical behavior of the useful reception device in the illumination-free case may also be formed by a capacitor which simulates the capacitive behavior of the useful reception device.

Transimpedance amplifiers are preferably used as preamplifiers.

Furthermore, it is regarded as advantageous if the optical receiver circuit has an integrated control circuit which makes it possible to control the feedback impedances of the two transimpedance amplifiers. By changing over the impedance magnitude of the feedback impedances, the gain of the transimpedance amplifiers and thus indirectly also the bandwidth of the receiver circuit can be set externally at the user end.

In order to ensure that the optical receiver circuit is constructed as symmetrically as possible, it is regarded as advantageous if the integrated control circuit is in each case connected to the feedback impedances of the two transimpedance amplifiers.

For symmetrical operation of the optical receiver circuit and thus for maximum interference suppression, it is advantageous if the reception device and the simulating electrical element are in each case connected to the same supply voltage. A low-pass filter is preferably connected to the supply voltage, which filter filters out high-frequency interference from the supply voltage.

The reception devices are preferably photodiodes.

The receiver circuit is preferably packaged in a TO-46 package or in a corresponding plastic package (e.g. TSSOP10 or VQFN20).

BRIEF DESCRIPTION OF THE DRAWING

The sole FIGURE of the drawing is a block diagram of an exemplary embodiment of an optical receiver circuit.

DESCRIPTION OF THE PREFERRED EMBODIMENT

The FIGURE shows a photodiode 10 as a reception device ("useful" reception device), which is connected to one terminal E30a of a differential amplifier 30 via a transimpedance amplifier 20. The other input E30b of the differential amplifier 30 is connected via a further preamplifier 40, embodied as a transimpedance amplifier, to a "dummy" photodiode 50 provided as a "dummy" reception device which electrically simulates the electrical behavior of the reception device 10 in the illumination-free case.

The transimpedance amplifier 20 is formed by a voltage amplifier 60, for example an operational amplifier, which is connected up to a feedback impedance RF1. In a corresponding manner, the further transimpedance amplifier 40 is formed by a voltage amplifier, for example an operational amplifier 70 identical to the operational amplifier 60, which is connected up to a further feedback impedance RF2 (RF1=RF2).

The output of the differential amplifier 30 is connected to a second differential amplifier 80, which further amplifies the output signal of the first differential amplifier 30. The output of the second differential amplifier generates an output signal $S_{res}'$ corresponding to the optical signal of the photodiode 10 and the inverted signal $-S_{res}'$, which is inverted with respect to the output signal $S_{res}'$.

The output of the differential amplifier 80 is connected to an AGC (amplitude gain control) control circuit 90. The output of the control circuit 90 connected to the two feedback impedances RF1 and RF2. The control circuit 90 sets the impedance RF1 and RF2 in a manner dependent on a control signal S3 present at a control input S90 of the control circuit 90. Via the control input S90, the gain of the two transimpedance amplifiers 20 and 40 can be set externally at the user end. Since the achievable gain V and the bandwidth B of the circuit are to an approximation related to one another (V*B=constant), by altering the gain it is also possible to set the achievable bandwidth at the user end. As an alternative or in addition, the control circuit 90 can also connect additional capacitances (or inductances) in parallel or in series with the two feedback impedances RF1 and RF2 in order to modify the feedback behavior and in order to avoid the occurrence of electrical oscillations, for example. Furthermore, the output signals $S_{res}'$ and $-S_{res}'$ of the second amplifier 80 are applied to the control circuit 90, so that the control circuit can prevent overdriving of the amplifier, for example.

Furthermore, the optical receiver circuit is equipped with a DCC circuit 100 (DCC: Duty Cycle Control), which effects a control of the optical receiver circuit. The DCC circuit 100 or the duty cycle control (offset control) formed by it controls the sampling threshold for the downstream differential amplifiers, so that the signal is sampled at the 50% value of the amplitude and, as a result, no signal pulse distortions (duty cycle) are produced. This can be effected by feeding a current into a respective one of the preamplifiers (transimpedance amplifiers) or else by feeding in a voltage at the inputs of the differential amplifiers directly.

As can furthermore be gathered from the FIGURE, the two photodiodes 10 and 50 are both connected in each case to a supply voltage VCC1, which is connected to a low-pass filter 110—comprising a capacitor $C_{PD}$ and a resistor $R_{PD}$.

The optical receiver circuit is operated as follows:

In the event of light being incident on the photodiode 10, an electrical signal S1 is fed into the transimpedance amplifier 20 and amplified by the latter. The amplified signal S1' is thus formed at the output of the transimpedance amplifier 20 and passes to the input E30a of the differential amplifier 30.

Interference signals St1, which are coupled or fed into the photodiode 10 or into the leads of the photodiode 10, are likewise amplified by the transimpedance amplifier 20 and transmitted as amplified interference signals St1' to the differential amplifier 30.

The dummy photodiode 50 is darkened—as indicated by the vertical bar in the FIGURE—in such a way that no light can fall onto the dummy photodiode 50. The photodiode 50 is thus optically inactive and merely has the function of a "dummy".

Despite all this, interference signals ST2 can be coupled into the "dummy" photodiode 50, for example via the leads of the photodiode 50. The interference signals ST2 are amplified by the further transimpedance amplifier 40 and pass as amplified interference signals ST2' to the further input E30b of the differential amplifier 30. Consequently, at the output of the differential amplifier 30, output signals $S_{res}$—and the inverted signals $-S_{res}$ with respect thereto—are formed in accordance with $$S_{res} = S1 + St1 - (S2 + St2).$$

Since the "dummy" photodiode 50 is darkened and thus cannot generate its own useful signal S2, the following holds true:

$$S2 = 0$$

Furthermore, it can be assumed that interference signals which are coupled into the photodiode 10 are also simultaneously coupled into the "dummy" photodiode 50, so that the following assumption is justified:

$$St1 = St2.$$

Consequently, at the output of the differential amplifier 30, overall an output signal is produced in accordance with $$S_{res} = S1,$$

namely because St1=St2 and S2=0.

In summary, it can thus be established that the use of two input paths of the same type—formed by the photodiode 10 and by the "dummy" photodiode 50—means that the receiver circuit is highly immune to interference since the interference signals St1 and St2 "concomitantly supplied" by the two photodiodes 10 and 50 at the input end are largely eliminated on account of the common-mode rejection of the differential amplifier 30.

The low-pass filter 110 at the power supply voltage VCC1 serves, moreover, to filter out high-frequency interference of the voltage supply VCC1, so that the interference cannot even reach the differential amplifier 30 in the first place. The FIGURE furthermore shows terminal pads 200 and 210, which can be connected to one another by means of a bonding wire 220. By means of such a bonding wire 220, the capacitor $C_{SYM}$ can be connected to the further transimpedance amplifier 40. In this case, the capacitor $C_{SYM}$ may replace the "dummy" photodiode 50 if such a photodiode 50 is not available. The capacitor $C_{SYM}$ is then preferably dimensioned in such a way that it essentially corresponds to the capacitance of the "absent" dummy photodiode 50 or the capacitance of the useful diode 10.

I claim:

1. An optical receiver circuit, comprising:
    a differential amplifier including a first input and a second input;
    an optical reception device connected to said first input of said differential amplifier by a first preamplifier said optical reception device having an electrical behavior in an illumination-free case;
    an electrical element for simulating the electrical behavior of said optical reception device in the illumination-free case, said electrical element connected to said second input of said differential amplifier by a second preamplifier; and
    said first preamplifier and said second preamplifier being identical user-settable transimpedance amplifiers.

2. The optical receiver circuit according to claim 1, wherein:
    said electrical element is formed by a darkened, further reception device.

3. The optical receiver circuit according to claim 2, wherein:
    said optical reception device and said further reception device are monolithically integrated on a chip.

4. The optical receiver circuit according to claim 1, wherein:
    said optical reception device and said electrical element are connected to a common supply voltage.

5. The optical receiver circuit according to claim 4, further comprising:
    a low-pass filter connected to the common supply voltage.

6. The optical receiver circuit according to claim 1, wherein:
    said optical reception device is a photodiode; and
    said electrical element is a photodiode.

7. The optical receiver circuit according to claim 1, further comprising:
    a package for packaging said differential amplifier, said optical reception device, and said electrical element, said package being selected from the group consisting of a TO-46 package, a TSSOP10 package, and a VQFN20 package.

8. The optical receiver circuit according to claim 7, further comprising:
    an integrated control circuit having a control terminal, said package having a terminal pin forming said control terminal.

9. An optical receiver circuit, comprising:
    a differential amplifier including a first input and a second input;
    an optical reception device connected to said first input of said differential amplifier by a first preamplifier, said optical reception device having an electrical behavior in an illumination-free case;
    an electrical element for simulating the electrical behavior of said optical reception device in the illumination-free case, said electrical element connected to said second input of said differential amplifier by a second preamplifier; and
    said first preamplifier and said second preamplifier being identical;
    an integrated control circuit;
    said first preamplifier being a transimpedance amplifier having a feedback impedance with a magnitude being settable by a user via said integrated control circuit; and
    said second preamplifier being a transimpedance amplifier having a feedback impedance with a magnitude being settable by a user via said integrated control circuit.

10. The optical receiver circuit according to claim 9, wherein:
    said integrated control circuit is connected symmetrically to said feedback impedance of said first amplifier and to said feedback impedance of said second amplifier.

11. The optical receiver circuit according to claim 9, wherein:
    said electrical element is formed by a darkened, further reception device.

12. The optical receiver circuit according to claim 11, wherein:
    said optical reception device and said further reception device are monolithically integrated on a chip.

13. The optical receiver circuit according to claim 9, wherein:
    said optical reception device and said electrical element are connected to a common supply voltage.

14. The optical receiver circuit according to claim 13, further comprising:
    a low-pass filter connected to the common supply voltage.

15. The optical receiver circuit according to claim 9, wherein:
    said optical reception device is a photodiode; and
    said electrical element is a photodiode.

16. The optical receiver circuit according to claim 9, further comprising:

a package for packaging said differential amplifier, said optical reception device, and said electrical element, said package being selected from the group consisting of a TO-46 package, a TSSOP10 package, and a VQFN20 package.

17. The receiver circuit according to claim 16, further comprising:

an integrated control circuit having a control terminal, said package having a terminal pin forming said control terminal.

18. An optical receiver circuit, comprising:

a differential amplifier including a first input and a second input;

an optical reception device connected to said first input of said differential amplifier by a first preamplifier;

a dummy optical reception device connected to said second input of said differential amplifier by a second preamplifier; and an integrated control circuit adapted to enable a user to externally control transimpendance characteristics of the first and second preamplifiers.

* * * * *

UNITED STATES PATENT AND TRADEMARK OFFICE
CERTIFICATE OF CORRECTION

PATENT NO. : 7,406,268 B2  Page 1 of 1
APPLICATION NO. : 10/649602
DATED : July 29, 2008
INVENTOR(S) : Karl Schrodinger It is certified that error appears in the above-identified patent and that said Letters Patent is hereby corrected as shown below:

Title Page, Column 1, Under "References Cited" and "U.S. PATENT DOCUMENTS", insert -- 5,410,145   A * 04/25/95   Coroy   250/215 --.

Column 6, Line 38, Claim 9, delete "transimpendance" and insert -- transimpedance --;

Column 6, Line 47, Claim 10, delete "first amplifier" and insert -- first preamplifier --;

Column 6, Line 48, Claim 10, delete "second amplifier." and insert -- second preamplifier. --;

Column 8, Line 10, Claim 18, delete "transimpendance" and insert -- transimpedance --;

Signed and Sealed this

Ninth Day of November, 2010

David J. Kappos
*Director of the United States Patent and Trademark Office*